(12) United States Patent
Ligot

(10) Patent No.: US 11,288,984 B2
(45) Date of Patent: Mar. 29, 2022

(54) MOBILE PROJECTION DEVICE FOR PROJECTION MAPPING

(71) Applicant: Philippe André Constant Ligot, Paris (FR)

(72) Inventor: Philippe André Constant Ligot, Paris (FR)

(*) Notice: Subject to any disclaimer, the term of this patent is extended or adjusted under 35 U.S.C. 154(b) by 0 days.

(21) Appl. No.: 16/055,184

(22) Filed: Aug. 6, 2018

(65) Prior Publication Data
US 2019/0051217 A1    Feb. 14, 2019

(30) Foreign Application Priority Data
Aug. 9, 2017   (FR) ...................................... 1757617

(51) Int. Cl.
| | |
|---|---|
| *G03B 21/14* | (2006.01) |
| *G03B 21/16* | (2006.01) |
| *G09B 29/00* | (2006.01) |
| *A63J 5/02* | (2006.01) |
| *G03B 21/54* | (2006.01) |
| *B60R 11/00* | (2006.01) |
| *G01C 15/00* | (2006.01) |

(52) U.S. Cl.
CPC ............. *G09B 29/005* (2013.01); *A63J 5/02* (2013.01); *G03B 21/16* (2013.01); *G03B 21/54* (2013.01); *B60R 2011/004* (2013.01); *G01C 15/00* (2013.01)

(58) Field of Classification Search
CPC .. G09B 29/005; B60R 2011/004; G03B 21/16
USPC ...................................................... 353/11–14
See application file for complete search history.

(56) References Cited

U.S. PATENT DOCUMENTS

| | | | | |
|---|---|---|---|---|
| 1,832,821 | A * | 11/1931 | Sponable ............... | G03B 21/56 352/132 |
| 3,475,045 | A * | 10/1969 | Cordes ..................... | B60P 3/18 296/21 |
| 5,580,140 | A * | 12/1996 | Katz ....................... | G09F 19/16 353/13 |
| 7,661,822 | B2 * | 2/2010 | Park ..................... | G03B 21/145 353/13 |
| 2005/0041212 | A1 * | 2/2005 | Weidow, III ........... | G03B 21/10 353/13 |

(Continued)

FOREIGN PATENT DOCUMENTS

| | | |
|---|---|---|
| CN | 104091550 A | 10/2014 |
| DE | 29719394 U1 | 2/1998 |

(Continued)

OTHER PUBLICATIONS

Patrick Lescouffe: "Tour d'éclairage 9 mètres sur remorque—Regles De Securite Donnees Techniques", www.kiloutou.fr, Dec. 15, 2014 (Dec. 15, 2014), XP055471612.

(Continued)

*Primary Examiner* — William C. Dowling
(74) *Attorney, Agent, or Firm* — Seckel IP, PLLC

(57) ABSTRACT

A mobile projection device for projection mapping, the device comprising a road vehicle having a structure mounted on wheels, and at least one light projector unit mounted on the structure and configured to be controlled so as to provide projection mapping in the environment outside the mobile projection device.

20 Claims, 3 Drawing Sheets

(56) References Cited

U.S. PATENT DOCUMENTS

| | | | |
|---|---|---|---|
| 2006/0268233 A1* | 11/2006 | Sato | G03B 21/10 |
| | | | 353/13 |
| 2007/0098368 A1 | 5/2007 | Carley et al. | |
| 2020/0018045 A1* | 1/2020 | Sano | E02F 9/261 |

FOREIGN PATENT DOCUMENTS

| | | | |
|---|---|---|---|
| FR | 609845 A | 8/1926 |
| GB | 222954 A | 10/1924 |
| RU | 90586 U1 | 1/2010 |
| WO | 2014125364 A2 | 8/2014 |

OTHER PUBLICATIONS

The Marketers' Guide to Projection Mapping.
The Infinity Wall: A Modern Mirage Nov. 26, 2016 https://vimeo.com/193173575.
The Infinity Wall Feb. 10, 2017 Adobe Create magazine https://create.adobe.com/2017/2/10/the_infinity_wall_.html.

* cited by examiner

MOBILE PROJECTION DEVICE FOR PROJECTION MAPPING

FIELD OF THE INVENTION

The present disclosure relates to the field of spectacles, and more particularly to a mobile projection device for projection mapping.

TECHNOLOGICAL BACKGROUND

Projection mapping, or providing spectacle lighting to be displayed on a space, is a burgeoning activity in which dynamic light beams are used to modify the visual impression given by a monument, an inside or outside space, a landscape, etc., in order to present a spectacle, create an ambience, enhance an event, a building, illustrate an architectural or signage project, etc.

Projection mapping is generally used in the context of major events for which the staging is created specifically. Each event presents particular constraints concerning the equipment, the human resources, and the logistics that are to be implemented, depending in particular on the light power required, on the type of staging that is envisaged (images that are more or less complex, stationary or moving or animated, etc.), on the background onto which the light is projected, on the three-dimensional configuration of the location in question, on regulatory constraints concerning the site, etc.

Thus, each project is conventionally handled in distinct manner. In order to satisfy the wide variety of needs, in the present state of the art, a projection mapping installation comprises scaffolding on which light projectors are positioned together with all of the equipment needed to operate them. The scaffolding and the light projectors are generally varied in order to adapt to each project.

Nevertheless, such an installation requires hoists and a large amount of manpower in order to put up the scaffolding, and to handle, connect and then chock each projector, such that the cost of setting up an installation and taking it down represents a very significant fraction of the budget for a projection mapping project. In addition, since each installation is unique, it is necessary, for each project, to be in a position to demonstrate that it satisfies criteria for being granted the necessary administrative authorizations, which are usually very constricting.

Given the increasing demand for projects of this type, there is a need for a novel type of projection device for projection mapping that is more flexible, and thus less expensive to use.

SUMMARY OF THE INVENTION

To this end, the present disclosure provides a mobile projection device for projection mapping, the device comprising a road vehicle having a structure mounted on wheels, and at least one light projector unit mounted on the structure and configured to be controlled so as to provide projection mapping in the environment outside the mobile projection device.

A road vehicle is a vehicle configured for and designed to travel on road. The vehicle may be a self-propelled vehicle or it may be a trailer. Such a vehicle has wheels, possibly mounted on one or more axles, that are dimensioned so as to be capable of supporting the structure and enabling it to travel, under normal travel conditions (i.e. without special authorization), on roads such as those in a conventional road network.

The mobile projection device may have a plurality of light projector units that may be identical or otherwise; consequently, for reasons of simplification and without loss of generality, reference is made to a single light projector unit. Such a light projector unit may be located inside the structure, the structure possibly forming an essentially closed shell around the light projector unit. In a variant, the shell may have a configuration that is open (in full or in part), e.g. during projection, and a configuration that is closed, e.g. while the road vehicle is traveling on the road network. Alternatively, a light projector unit may be mounted on the roof of the structure. In the meaning of the present disclosure, light projection includes projecting a laser beam, but it is not limited to such an example.

It can be understood that in any event, the structure is configured to receive one or more light projector units in such a manner that said unit(s) can perform projection mapping.

The environment outside the mobile projection device designates what is to be found outside the mobile projection device and what is to constitute the medium on which the projection mapping is performed. For example, the environment may comprise a monument, an inside or outside space, or indeed a landscape.

By using such a mobile projection device, which forms an integrated assembly, it is possible to provide projection mapping at lower cost. Actually, analysis performed by the inventor has led to the observation that, contrary to received ideas, the technical and regulatory constraints applicable to each projection mapping project are usually similar. Consequently, the design of a single device that is flexible, such as the above-specified mobile device, makes it possible to satisfy the specifications for most projects and to reduce significantly operating costs and also the time required for installation. In addition, the use of a single device makes administrative procedures significantly easier since the device needs to be certified once only. Furthermore, insofar as the device is mobile, it is easy to install and to take away, thereby reducing the installation costs and also making it easier to obtain administrative authorizations, since it is possible to move the device very quickly in the event of an immediate need, e.g. associated with security.

When the road vehicle is a self-propelled vehicle, it may have an engine and a transmission for driving the vehicle. When the road vehicle is a trailer, it may include a tow member suitable for being connected to a tractor vehicle. Where applicable, the structure of the trailer may include legs for ensuring that the mobile device is stable in the absence of the tractor vehicle.

In some embodiments, the light projector unit may, in non-limiting manner, be of the type selected from the group formed by: spotlights, retroprojectors, videoprojectors, laser devices, and holographic devices. It can be understood that the light beam emitted by the light projector unit is dynamic, i.e. the light projector unit can be controlled so that the projected image changes or is moved. Thus, the light projector unit can be controlled to modulate at least the shape, the drawing, the color, the intensity or the direction of the light beam, as opposed to a static lighting. In other words, the light projector unit is configured to emit one or a plurality of dynamic light beams, so that the resulting image can be the combination of a plurality of shapes and/or drawings and/or colors and/or can be moved or animated. When the mobile device has a plurality of light projector units, each of said units may be of a type selected from the above group. In addition, the units may all be of the same type or they may be of different types.

In some embodiments, the light projector unit is mounted to be movable relative to the road vehicle. For example, the light projector unit may be mounted to be movable in translation and/or in rotation. Thus, the light projector unit may be mounted on the structure via a movable or hinged connection. In particular, the light projector unit may be movable at least between one or more transport positions for holding the light projector unit suitably while the road vehicle is moving, and one or more projection positions in which said unit is suitable for providing projection mapping.

In some embodiments, the mobile projection device further comprises a system for removing the heat produced by the light projector unit. Such a heat removal system serves to avoid the temperature inside the structure increasing excessively while the projector unit is in operation. Such a system was not useful in a prior art installation in which the projectors were located essentially outdoors and sufficient heat was removed naturally.

In some embodiments, the heat removal system may include an air extractor unit connected to a cooling air outlet from the light projector unit. Typically, the light projector unit includes an internal cooling member, such as cooling fins or a fan, with cooling air that is generally hotter than ambient air being removed through an outlet. Thus, the cooling air to be removed is recovered directly at the outlet from the light projector unit, thereby improving heat removal.

In some embodiments, the road vehicle includes a cabin for controlling and/or monitoring the light projector unit. The cabin may be suitable for receiving one or more operators. The cabin may comprise a control and/or monitoring station suitable for being operated by an operator. The cabin, or more generally, the structure, may include a housing for computer control and/or monitoring equipment.

In some embodiments, the structure is provided with at least one window, the light projector unit being mounted so as to be capable of projecting through the window. The window may be a through opening formed in an outside wall of the structure. Alternatively, the window may be an opening fitted with material that allows light to pass through, e.g. glazing or the equivalent. The structure may be provided with a plurality of windows, in particular windows corresponding to a plurality of projection positions for the light projector unit and/or to a plurality of light projector units. Naturally, in some embodiments, the window(s) may be provided with removable shutters, which shutters may be opaque, but that is not essential.

In some embodiments, the light transmittance through said window is greater than or equal to 90%, preferably greater than or equal to 92%, more preferably greater than or equal to 95%. Thus, the light passes through ambient air or through material that is particularly transparent, so light losses on passing through the window are considerably limited, thereby improving the overall efficiency of the device.

In some embodiments, the light projector unit is arranged in an upper portion of the structure. The term "upper" should be understood for the mobile projection device in its normal utilization configuration i.e. when its wheels are at the bottom in the gravity direction (i.e. the direction of acceleration due to the Earth's gravity). The upper portion may refer to the upper half of the structure, which is preferably more than 2 meters (m) above the ground, as identified by the bottoms of the wheels or by the bottoms of legs, if any, and is preferably more than 2.5 m above the ground.

If there is a cabin, it may be situated in the lower portion of the structure.

The present disclosure also provides a mobile projector set comprising a mobile projection device as described above and in which the road vehicle is a trailer, together with a tractor vehicle configured to tow the trailer, the tractor vehicle including an energy generator and the mobile projection device including power supply means configured to power the light projector unit with energy from the energy generator.

It can thus be understood that the light projector unit may be powered via the power supply means by the energy generator of the road vehicle, but not only from that source. For example, as an alternative or in addition, the light projector unit may be powered via its power supply means by other sources, such as for example a source of energy external to the mobile projector set (e.g. an external electricity outlet). In a variant, the mobile projection device may include, in addition or as a replacement, its own energy generator for powering the power supply means, independently of any energy source external to the mobile projection device. The energy generator of the tractor vehicle may be powered directly by the same source of energy as is used for propelling the tractor vehicle. Thus, since the tractor vehicle can be separated from the trailer, the trailer may be left in place, with the light projector unit operating or not operating, while the tractor vehicle is driven to fill up its energy source.

The present disclosure also provides the use of a mobile projection device as described above for providing a projection mapping service.

BRIEF DESCRIPTION OF THE DRAWINGS

The invention and its advantages can be better understood on reading the following detailed description of embodiments of the invention given as non-limiting examples. The description refers to the accompanying drawings, in which.

DETAILED DESCRIPTION OF EMBODIMENTS

Figure 1:
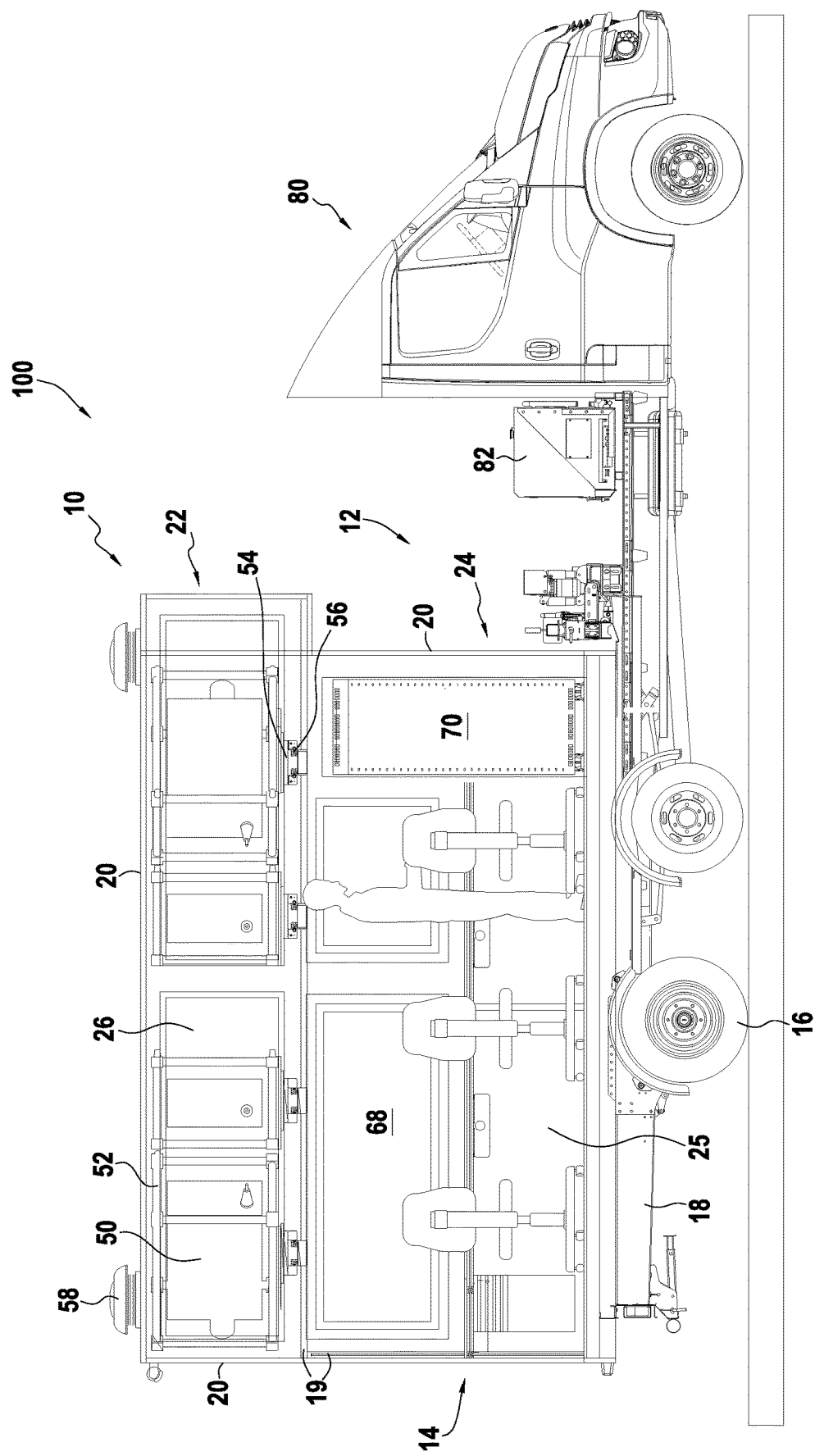
FIG. 1 is a side view in section showing a mobile projector set in a first embodiment.
Figure 2:
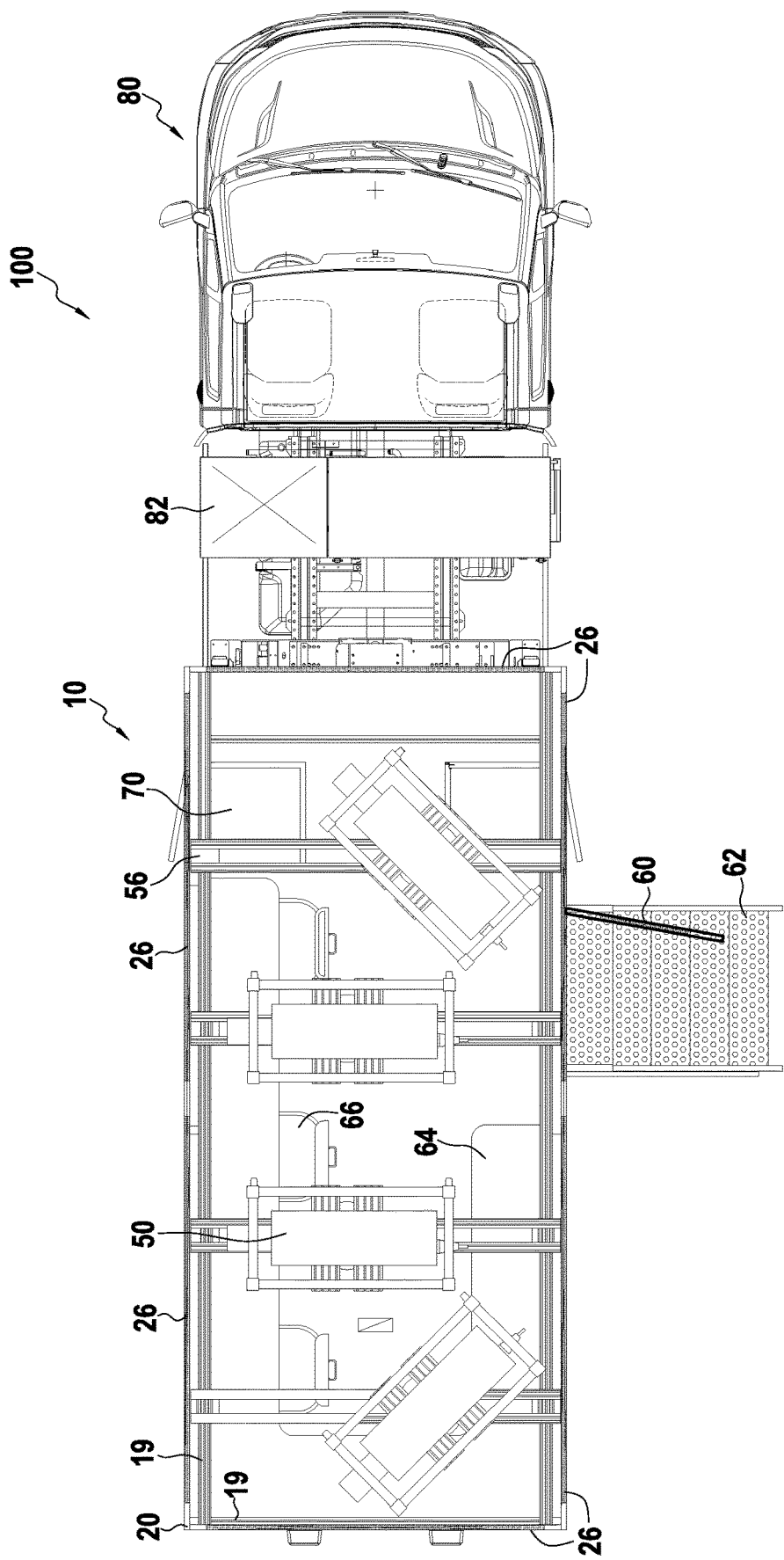
FIG. 2 is a plan view of the mobile projector set in the first embodiment.

FIGS. 1 and 2 show a mobile projector set 100 in a first embodiment. In this example, the mobile projector set 100 is in the form of a truck, here a 3.5 (metric) tonne (t) truck, approved for road use under normal traffic conditions. The mobile projector set 100 comprises a mobile projection device 10 and a tractor vehicle 80 configured to tow the mobile projection device 10.

The mobile projection device 10 is specially adapted for providing projection mapping services. It comprises a road vehicle 12, in this example a trailer, and at least one light projector unit 50 configured to emit and project a light beam for projection mapping, i.e. a dynamic light beam. For instance, the trailer 12 comprises a structure 14 mounted on wheels 16, in this example via a chassis 18 with one or more axles.

The structure 14 has bars 19. In this embodiment, the bars 19 support outside walls 20, here walls that are substantially vertical or horizontal (considered relative to the gravity direction), defining an inside space of the structure 14. The bars 19 and the outside walls 20 are assembled on the chassis 18. When considered in the gravity direction, the inside space presents an upper portion 22 of the structure 14 and a lower portion 24 of the structure 14. In this embodiment, the upper portion 22 of the structure 14 forms a housing that receives at least one projector unit 50. The lower portion 24 of the structure 14 may form a cabin 25, in particular for controlling and/or monitoring the light projector unit 50. The upper portion 22 is preferably located at least 2 m above the ground, and in this example at least 2.7 m. The total height of the road vehicle 12 may be less than or equal to 4 m in order to enable it to travel under normal conditions (i.e. without special authorization).

The structure 14 may have at least one window 26 for allowing light coming from the light projector unit 50 to pass through. In this embodiment, the window 26 is in the form of an opening formed in the outside wall 20 and closed by transparent material, e.g. by approved non-tinted glazing of the "extra-clear" type. The glazing may also be made using safety glass. Such a material has light transmittance that is greater than or equal to 90% throughout the visible range (wavelengths in the range approximately 400 nanometers (nm) to 800 nm). Alternatively, the window 26 may be merely a non-closed opening. Furthermore, the window 26 may be masked by a shutter or removable cover that is to be open or taken off during projection.

In this example, and as can be seen in FIGS. 1 and 2, the structure 14 has a plurality of windows 26. Each window 26 may have all or some of the above-described characteristics. The windows 26 may be provided on different sides of the structure 14 so as to be able to project a light beam in several directions. In an embodiment, each lateral outside wall 20 has at least one window 26. In addition, a window 26 may be shared between a plurality of light projector units 50. The projector unit 50 may be configured to project through a window 26 directly or via optical transformation and/or transmission systems (lenses, filters, reflectors, optical fiber, etc.). It is preferable to maximize the size of the window 26 in order to limit the presence of bars and opaque walls on the path of the light beams.

As mentioned above, the mobile projection device 10 has at least one light projector unit 50 mounted on the structure 14 and configured to be controlled so as to provide projection mapping in the environment outside the mobile projection device. In this embodiment, the mobile projection device 10 has four light projector units 50, e.g. arranged in a substantially horizontal row; nevertheless, other arrangements are possible. In this example, the units 50 are identical, however they could differ from one another. In this embodiment, the light projector units 50 are video projectors. Nevertheless, other types of unit could be selected, e.g. retroprojectors, laser devices, holographic devices, or any analogous system able to be controlled to modulate at least the shape, the color, the intensity or the direction of the light beam. In this example, each light projector unit 50 is positioned facing at least one window 26 so as to be able to project a light beam through said window 26. In an example, the electrical power of each light projector unit 50 may be greater than or equal to 1500 watts (W), preferably greater than or equal to 1800 W, more preferably greater than or equal to 2100 W, still more preferably greater than or equal to 2500 W, still more preferably greater than or equal to 2700 W. Below, and unless specified to the contrary, only one light projector unit 50 is described.

As shown in FIGS. 1 and 2, the light projector unit 50 may be mounted in a frame 52. In order to reduce the weight of the mobile projection device 10, the frame may be made of a lightweight material such as carbon or aluminum. The frame 52 may itself be placed on a turntable 54. In this example, the turntable is rotatable about a vertical axis. In turn, the turntable 54 may be mounted on rails 56, extending transversely in this example, relative to which it can be moved in translation, typically by means of wheels or by using a slideway connection. These elements form a corresponding number of movable connections between the light projector unit 50 and the structure 14.

Thus, the light projector unit 50 can be mounted to be movable relative to the road vehicle 12. More precisely, the light projector unit 50 in this example is mounted to be movable in translation and to be movable in rotation relative to the road vehicle 12. In this embodiment, the unit 50 is movable in translation horizontally on the rails 56. Independently, the unit 50 is movable in rotation relative to a vertical axis by means of the turntable 54. Also independently, the unit 50 is movable in rotation relative to a horizontal axis perpendicular to the projection direction, by adjusting the angle between the frame 52 and the unit 50. Also independently, the unit 50 is movable in rotation relative to a horizontal axis parallel to the projection direction, the frame 52 being capable of tilting about such an axis so as to be capable of occupying a vertical position or a horizontal position, for example.

It is thus possible to direct each light projector unit 50 independently so as to project the corresponding light beam in the desired direction. Given the arrangement of the windows 26 over substantially the entire lateral periphery of the light projector unit 50, the present mobile projection device makes it possible to envisage projecting over substantially 360° with little constraint on the positioning of the road vehicle.

Furthermore, in this example, the light projector unit 50 is placed on top of the structure 14 on the rails 56 carried by the bars 19. In other embodiments, the light projector unit 50 could be suspended from the structure 14.

In order to remove the heat produced by the light projector unit 50, the mobile projection device 10 may include a heat removal system. In this example, the system has four air extractor units 58, one for each light projector unit 50. Nevertheless, depending on requirements, more or fewer air extractor units 58 may be provided.

In this embodiment, each air extractor unit 58 is connected directly to a cooling air outlet of a corresponding light projector unit 50. The connection may be made by means of a temperature-withstanding sheath, of conventional type.

As mentioned above, the road vehicle 12 may have a cabin 25 for controlling and monitoring the light projector unit 50. The cabin 25 is configured to receive at least one operator. Thus, the structure 14 may be provided with a door 60 and access means such as steps 62 to enable an operator to enter into the cabin 25. The cabin 25 may have arrangements such as a work surface 64, seats 66, monitoring windows 68, and computer racks 70. The computer racks 70 may be connected to the light projector unit 50 by suitable cabling.

As can be seen in FIG. 2, no opaque separation is provided between the lower portion 24 of the structure 14 forming the cabin 25 and the upper portion 22 of the structure 14 in which the light projector units 50 are arranged. Thus, an operator in the cabin can monitor and control the light projector unit 50, possibly via the computer means contained in the racks 70 and/or via other means.

As mentioned above, the mobile projector set includes a tractor vehicle 80. In this example, the tractor vehicle 80 is a truck tractor vehicle that is conventional, apart from the points described below.

In particular, the tractor vehicle 80 includes an energy generator 82, in particular for generating electricity. The energy generator 82, in particular an electricity generator, is suitable for delivering energy to the mobile projection device 10, which receives it via appropriate power supply means (not shown). In this example, the power supply means are thus powered by the energy generator 82 of the road vehicle 12, these power supply means in turn powering the light projector unit 50, and more generally the entire electrical installation present within the mobile projection device 10.

The energy generator 82 may be powered directly by the energy source used for propelling the tractor vehicle 80. In this example, the electricity generator may be powered by fuel from the tank for the engine of the tractor vehicle 80. Where necessary, it is possible to drive the tractor vehicle 80 to a service station in order to fill the fuel tank of the engine (or when applicable of the energy generator), while leaving the trailer 12 in place.

In other embodiments, an energy generator may be provided as an alternative or in addition directly on the mobile projection device 10.

The mobile projection device 10 or the mobile projector set 100 may be used for providing a projection mapping service. For example, the mobile projector set 100 is driven to the site where the service is to be provided. While traveling, the light projector unit 50 may be locked in a transport position for limiting any damage that might occur as a result of road travel, e.g. in a horizontal position substantially in the middle of the rails 56. Once on site, the road vehicle 12 may optionally be separated from the tractor vehicle 80 and/or supported by legs. The road vehicle 12 is electrically powered, e.g. by the tractor vehicle 80 or by an external energy source available on site. The light projector units 50 are moved from their transport position to a projection position for providing the projection mapping. If any, the covers preventing light from passing through the windows 26 can be taken off. The cabin 25 may have been equipped beforehand. The mobile projection device 10 can thus be installed simply and quickly, and be in a position to provide the projection mapping service in the environment outside said device 10.

The projection mapping may be performed by switching on the light projector units 50 and controlling the movements and/or changes of image in said units 50, e.g. with the help of the computer equipment. Once the projection mapping has been completed, the mobile projection device 10 may be left in position for a future projection, or it may be uninstalled, e.g. by performing steps opposite to those described above.

Figure 3:
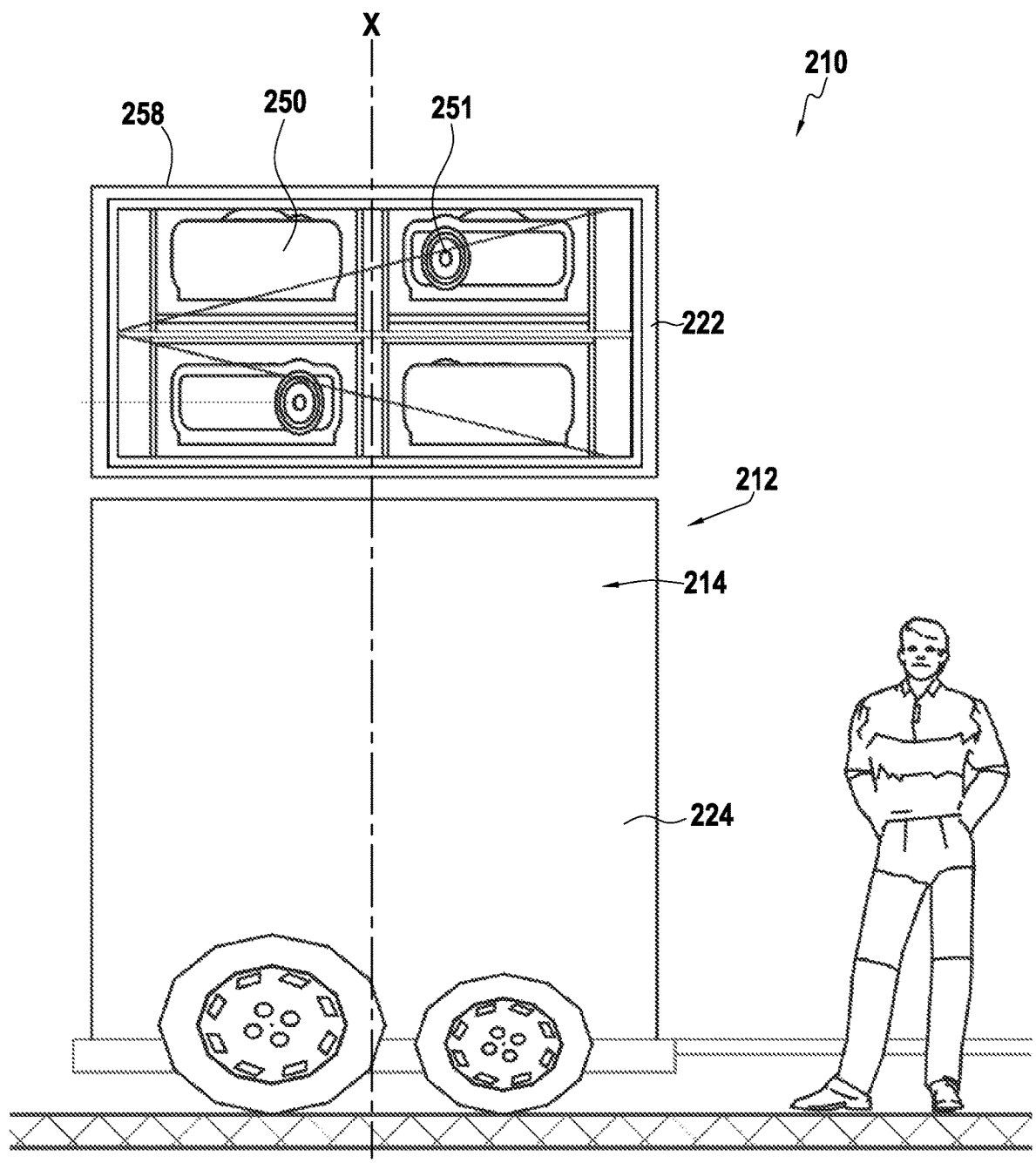
FIG. 3 is a diagrammatic side view of a mobile projection device in a second embodiment.

FIG. 3 shows a mobile projection device in a second embodiment. In this figure, elements that correspond to or are identical to elements of the first embodiment are given the same reference signs, with the exception of the hundreds digit, and they are not described again.

A mobile projection device 210 in a second embodiment comprises a road vehicle 212 that is likewise of the trailer type. Nevertheless, in comparison with the first embodiment, the structure 214 is smaller, such that it does not include a cabin 25 for controlling and/or monitoring the light projector unit 50. The lower portion 224 of the structure 214 houses computer racks and the necessary cabling.

In addition, instead of being arranged in a row, the light projector units 250 are arranged in two rows that are superposed along the gravity direction. In this embodiment, the light projector units 250 may include turning means, e.g. similar to the above-described turning means. Thus, as shown in FIG. 3, in order to be able to project to both sides of the mobile projection device 210, the light projector units 250 are pointed in pairs towards opposite sides of the mobile projection device 210. In addition, as can also be seen FIG. 3, each light projector unit 250 may be configured and/or arranged so that its projection lens 251 is closer to a central axis X of the structure 214 than to the sides of the structure 214 in a direction perpendicular to the projection direction.

As an alternative to the air extractors 58 of the first embodiment, the mobile projection device 210 in the second embodiment includes air vents 258, e.g. provided in a top wall of the structure 214, more precisely in a top wall of the upper portion 222 in which the light projector units 250 are arranged. In other embodiments, the air vents 258 and the air extractors 58 could be combined.

The mobile projection device 210 in the second embodiment may be towed by a vehicle of smaller power than the tractor vehicle 80 of the first embodiment, e.g. a utility vehicle.

In a variant to the embodiments described above, the road vehicle of the mobile projector unit could be a self-propelled vehicle.

Although the present invention is described with reference to specific embodiments, modifications may be made to those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A mobile projection device for projection mapping, the device comprising a road vehicle having a structure mounted on wheels, and at least one light projector unit arranged in an upper portion of the structure and configured to be controlled so as to provide projection mapping in the environment outside the mobile projection device, wherein the upper portion is located at least 2 meters above the ground, wherein the structure is provided with windows, of which a first window is provided on a first lateral wall of the structure, the light projector unit being mounted so as to be capable of projecting through one or more of the windows, the light transmittance through the one or more of the of the windows being greater than or equal to 90% in the visible range.

2. The mobile projection device according to claim 1, wherein the road vehicle is a self-propelled vehicle or a trailer.

3. The mobile projection device according to claim 1, wherein the light projector unit is mounted to be movable relative to the road vehicle.

4. The mobile projection device according to claim 1, further comprising a system for removing the heat produced by the light projector unit.

5. The mobile projection device according to claim 1, wherein the road vehicle includes a cabin for controlling and/or monitoring the light projector unit.

6. A mobile projector set comprising a mobile projection device according to claim 1 in which the road vehicle is a trailer, together with a tractor vehicle configured to tow the trailer, the tractor vehicle including an energy generator and the mobile projection device including power supply means configured to power the light projector unit with energy from the energy generator.

7. A projection mapping method, comprising using a mobile projection device according to claim 1 for providing a projection mapping service.

8. The mobile projection device according to claim 1, wherein the at least one light projector unit comprises a projection mapping projector.

9. The mobile projection device according to claim 1, wherein the windows comprise glazing.

10. The mobile projection device according to claim 9, wherein the light transmittance through the one or more of the windows is equal to or greater than 92% in the visible range.

11. The mobile projection device according to claim 10, wherein the light transmittance through the one or more of the windows is equal to or greater than 95% in the visible range.

12. The mobile projection device according to claim 1, wherein the windows are arranged around a lateral periphery of the light projecting unit.

13. The mobile projection device according to claim 1, wherein the windows include a second window on a second lateral wall of the structure.

14. The mobile projection device according to claim 1, wherein the one or more of the windows comprises glazing.

15. The mobile projection device according to claim 1, comprising a plurality of light projector units.

16. The mobile projection device according to claim 15, wherein each of the plurality of light projector units is independently directable and movable relative to the road vehicle.

17. The mobile projection device according to claim 1, comprising a plurality of light projector units mounted so as to be capable of projecting through the windows.

18. The mobile projection device according to claim 1, wherein the light projector unit is mounted so as to be capable of projecting through more than one of the windows.

19. The mobile projection device according to claim 18, wherein the light projector unit is mounted so as to be capable of projecting through the first window provided on the first lateral wall of the structure, the light transmittance through the first window being greater than or equal to 90% in the visible range.

20. The mobile projection device according to claim 1, wherein the light projector unit is mounted so as to be capable of projecting through the first window provided on the first lateral wall of the structure, the light transmittance through the first window being greater than or equal to 90% in the visible range.

* * * * *